Sept. 24, 1946.  J. G. VARTANIAN  2,408,243
HOSE COUPLING
Filed June 21, 1944  2 Sheets-Sheet 1
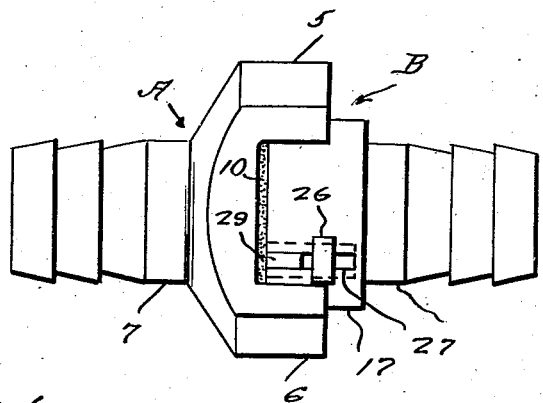
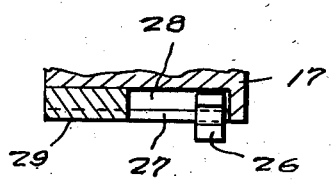
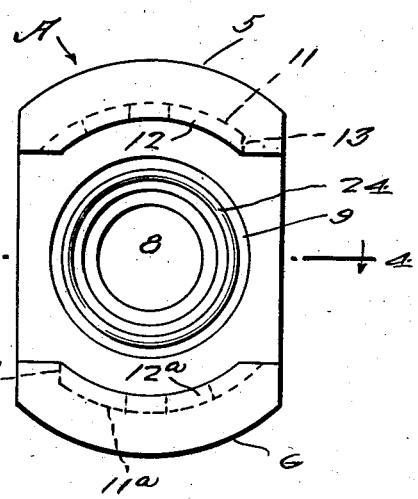
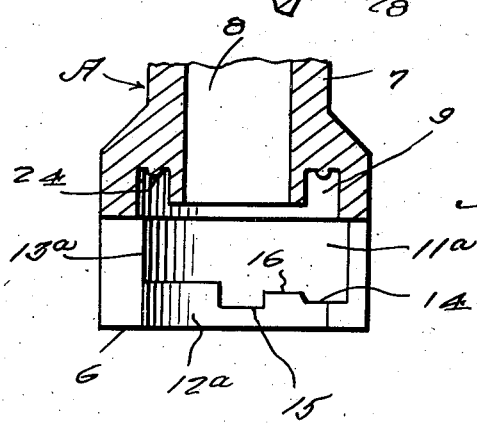
Inventor
JOHN G. VARTANIAN,
By Clarence A. O'Brien
and Harvey B. Jackson
Attorneys

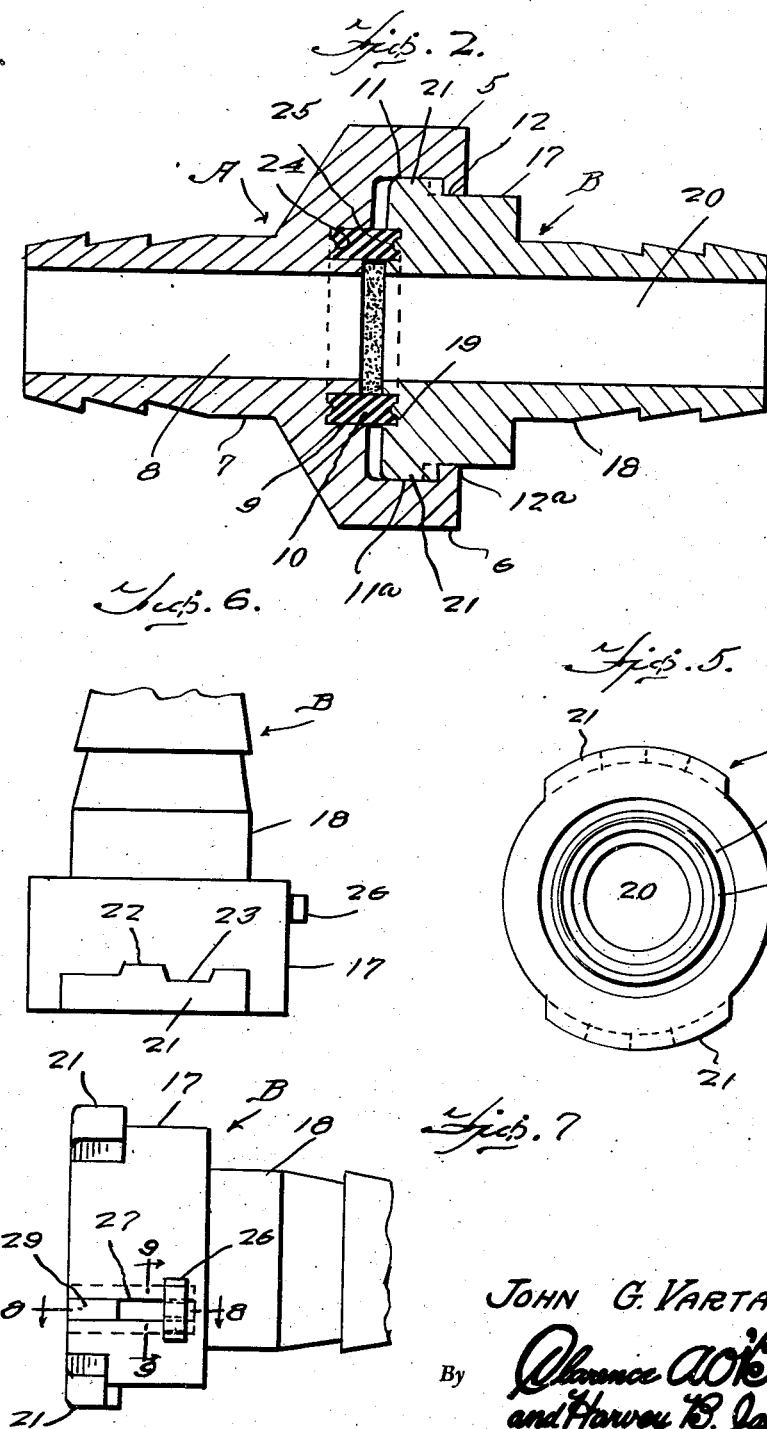

Patented Sept. 24, 1946

2,408,243

UNITED STATES PATENT OFFICE 2,408,243

HOSE COUPLING

John G. Vartanian, Hanford, Calif.

Application June 21, 1944, Serial No. 541,323

2 Claims. (Cl. 285—175)

This invention relates to hose couplings, and has for its primary objects the provision of a coupling of non-breakable, non-metallic construction, and one which is equipped with novel and efficient means whereby a quick and easy connection and disconnection of the male and female members thereof may be effected.

A further object of the invention is the provision of a compressible packing sleeve between the male and female members to yieldingly force the same into positive interlocking engagement and to prevent the leakage of gas or liquid that may pass through the coupling.

Still another object of the invention is the provision of a coupling of the character described that is most economical to manufacture, that can be manipulated without danger of slipping in the hands of the user during the coupling or uncoupling operation, and that is most highly serviceable in use and efficient in operation.

Other objects and features of the invention will become apparent from the following description when considered in connection with the accompanying drawings, and the invention consists in the novel form, combination and arrangement of parts hereinafter more fully described, shown in the drawings and claimed.

In the drawings, wherein like reference characters indicate corresponding parts throughout the several views:

Figure 1 is an elevational view of a hose coupling constructed in accordance with the present invention.

Figure 2 is an enlarged central longitudinal sectional view thereof.

Figure 3 is an end elevational view of the female coupling member per se, as seen looking toward the left of Figure 2.

Figure 4 is a fragmentary section taken substantially on the line 4—4 of Figure 3.

Figure 5 is an end elevational view of the male coupling member per se, as seen looking toward the right of Figure 2.

Figure 6 is a fragmentary side elevational view of the male coupling member.

Figure 7 is a fragmentary section taken on line 7—7 of Figure 6.

Figure 8 is a section on line 8—8 of Figure 7.

Figure 9 is a section on line 9—9 of Figure 7.

While the present invention is capable of general use, it has been found especially serviceable for coupling the air brake hose between a motor vehicle and a trailer towed by said vehicle.

Referring in detail to the drawings, the present coupling includes a female member A and a male member B adapted to be interlocked by a relative rotation of one with respect to the other. The female coupling member A includes a pair of diametrically opposed similar curved jaws 5 and 6 formed on one end of a hose nipple 7 having a bore 8. A relatively deep annular groove 9 is formed in the end of the nipple 7 that carries the jaws 5 and 6, said groove being in concentric surrounding relation to the bore 8 and receiving a major end portion of an axially compressible resilient packing sleeve 10. The jaws 5 and 6 have grooves 11 and 11a formed circumferentially of and in the inner faces thereof so as to provide inwardly projecting arcuate flanges 12 and 12a at the outer sides of said grooves. As clearly indicated by dotted lines in Figure 3, the grooves 11 and 11a open through opposite ends of the jaws 5 and 6 and terminate in shoulders 13 and 13a adjacent the other sides of said jaws 5 and 6. At the open ends of the grooves 11 and 11a, the flanges 12 and 12a are reduced in thickness at their inner sides, as at 14, and are provided intermediate their ends with notches or recesses 15 in their inner sides, a projecting lug 16 being formed between the reduced portion 14 and the notch or recess 15.

The male coupling member B includes a solid cylindrical head 17 externally formed on one end of a hose nipple 18, and a shallow annular groove 19 is formed in the end of nipple 18 that is provided with the head 17, said groove 19 being in concentric surrounding relation to the bore 20 of nipple 18 and of the same diameter as the groove 9 of the female coupling member A. The groove 19 is thus adapted to receive the projecting end portion of the packing sleeve 10. The head 17 is formed at opposite sides with arcuate circumferentially extending ribs 21 that are formed intermediate their ends and on their outer sides with projecting lugs 22 of a size to be received in the notches 15 in the flanges 12 and 12a of the female coupling member A. Also, at one side of each lug 22, each rib 21 is formed with a recess 23 to receive the lug 16 of the associated flange 12 or 12a of the member A. Thus, when the head 17 of the coupling member B is disposed between the jaws 5 and 6 with the ribs 21 disposed at opposite sides of the jaws 5 and 6, the male coupling member B may be forced toward the female coupling member A so that the packing sleeve 9 is received in the groove 19 and then compressed so as to allow the ribs 21 to move into the grooves 11 and 11a upon rotating the coupling member B in a clockwise direction relative to the member A as viewed in Figure 3. As soon as the ends of the ribs 21 abut the shoulders 13 and 13a, the coupling member B is released so as to allow the packing sleeve 9 to expand and cause engagement of lugs 22 in notches 15 and engagement of lugs 16 in notches 23. The compressed packing sleeve 10 yieldingly urges the coupling members apart so as to keep the lugs 16 and 22 engaged in the notches 23 and 15 and thereby effectively prevent disconnection of the coupling members unless they are forced toward each other so as to increase the compression of packing sleeve 10 and then given relative rotation to slide the ribs 21 out of the grooves 11 and 11a. The packing sleeve 10, being maintained under compression when the coupling members are coupled, insures an effective leak-proof joint between said coupling members. In order to more effectively seal the joint between the coupling members, they are provided centrally of and on the bottom of the grooves 9 and 19 with annular ribs or beads 24 and 25 that engage the end edges of the packing sleeve 10 so as to expand the wall of said packing sleeve 10 tightly against opposite side walls of the grooves 9 and 19 at the bottoms of the latter.

In order to more positively guard against any possible accidental separation of the coupling members, I provide a manually operable sliding lock 26 on the head 17 of the coupling member B, and arranged to be slid toward the coupling member A to engage that side of jaw 5 or jaw 6 opposite that through which the associated groove 11 or 11a extends. This will of course prevent rotation of coupling member B relative to coupling member A in the direction necessary for disconnection of the coupling members, unless the locking element 26 is retracted from behind the side of the jaw 5 or 6. In the relationship shown, the locking member 26 is engaged behind the side of jaw 6, and it consists of an I-shaped member slidable in a slot 27 of head 17 and having one cross member engaged in an undercut groove 28 inwardly of and communicating with the slot 27, the outer cross member of the locking element 26 being disposed outwardly of slot 27 in position to engage behind a side of the jaw 6, as shown in Figure 1. After the locking element 26 is inserted in slot 29 and groove 28, the ends of slot 26 and groove 28 are closed by means of a plug 29 inserted in said slot and groove at the free end of head 17 and suitably permanently secured in place. Thus, locking element 26 is mounted in head 17 for limited sliding movement so that it may be moved to a locking position or a retracted or released position as respectively shown in Figures 1 and 7. At the same time, the block 29 prevents removal and loss of the locking element 26 with respect to head 17.

The operation of the coupling having been explained during the description of the structure, it is believed that such operation, as well as the advantages of the invention, will be readily apparent to those skilled in the art.

As metallic coupling members have a tendency to slip in the hands, I propose to construct the members of the present coupling of a cellulose acetate composition or the like to overcome this annoyance and thereby enable the user to effectively grip the coupling members to bring about their ready relative movement for coupling or uncoupling the same. The coupling members may be cast from this composition, whereupon they are cleaned and ready for use without any machining of the members as required with metallic coupling members.

Minor changes in details of construction illustrated and described are contemplated, such as fall within the spirit and scope of the invention as claimed.

What I claim is:

1. A hose coupling comprising separable male and female coupling members, said female coupling member including a hose nipple having spaced diametrically opposed curved jaws integral with one end of the same said nipple being formed at said end with an annular groove concentric with and surrounding its bore, said jaws having circumferentially extending arcuate grooves in their inner faces that open through opposite sides of the respective jaws and terminate in shoulders inwardly of the other sides of said jaws, said grooves defining inwardly extending arcuate flanges on the jaws at the outer sides of said grooves, said flanges having inwardly projecting lugs on and recesses in the inner sides thereof, said male coupling member including a second hose nipple externally enlarged at one end to provide a cylindrical head snugly receivable between the jaws of the female coupling member, said head being formed at its outer end with an annular groove registerable with the annular groove of the nipple of the female coupling member, said head further being formed on opposite sides of its outer end portion with circumferentially extending arcuate ribs receivable in the grooves of said jaws and provided at their inner sides with inwardly projecting lugs and with recesses to respectively engage in the recesses of and to receive the lugs of said flanges upon relative separating movement of the coupling members when the ribs are engaged in said arcuate grooves, and a compressible packing sleeve having its opposite ends engaged in the annular grooves of the nipples and yieldingly acting to effect said relative separating movement of the coupling members, the spaces between adjacent sides of said jaws being greater than the length of said arcuate ribs.

2. The construction defined in claim 1, in combination with a sliding locking member carried by said head of the male coupling member and engageable behind a side of one of the jaws of the female coupling member to positively prevent the relative rotation of the coupling members necessary for their uncoupling.

JOHN G. VARTANIAN.